United States Patent Office 3,830,863
Patented Aug. 20, 1974

3,830,863
PRODUCTION OF 1-METHYL-3-PHENYLINDANS
Herbert Armbrust, Gruenstadt, Gerhard Kilpper, Scheidt, Hans-Juergen Quadbeckseeger, Ludwigshafen, Hans-Juergen Sturm, Gruenstadt, Waldemar Koehler, Frankenthal, and Hans-Georg Schecker, Ludwigshafen, Germany, assignors to Badische Anilin- & Soda-Fabrik Aktiengesellschaft, Ludwigshafen, Germany
No Drawing. Filed Dec. 4, 1972, Ser. No. 312,136
Int. Cl. C07c 3/10, 15/20
U.S. Cl. 260—668 F
10 Claims

ABSTRACT OF THE DISCLOSURE

Production of 1-methyl-3-phenylindans by dimerization of styrenes in the presence of a catalyst and a surfactant. The compounds obtainable by the process of the invention are valuable starting materials for the production of dyes and pesticides.

---

The invention relates to a process for the production of 1-methyl-3-phenylindans by dimerization of styrenes in the presence of catalysts and surfactants.

It is known that styrene can be dimerized in the presence of phosphoric acid, sulfuric acid or other mineral acids and also in the presence of solid acid catalysts at elevated temperature into a mixture of 1,3-diphenyl-butene-(1) and 1-methyl-3-phenylindan (J. Org. Chem., volume 19 (1954), pages 17 et seq., and volume 27 (1962), pages 1636 et seq.; J. Chem. Soc., 1964, pages 1573 et seq.; Organic Synthesis, coll. volume IV (J. Wiley, New York), pages 665 et seq.). The reaction is a complicated system of side reactions and secondary reactions. The first stage in the reaction is the dimerization of the monomeric styrene into 1,3-diphenylbutene-(1). Cyclization of the trans form into indan follows as a secondary reaction. Trimers and higher polymers of styrene are formed as other undesired byproducts starting from the cis and trans forms.

All these methods are unsatisfactory economically on an industrial scale. Whereas high reaction rates (space-time yields of about 1 kg. of indan per liter of reaction space per hour) give yields of end product of only up to 30% of theory in addition to large amounts of higher linear styrene oligomers, lower reaction rates give higher yields but only at low space-time yields of about 0.01 kg. per liter per hour.

It is known from Belgian Pats. 757,175 and 759,536 that styrenes can be dimerized in the presence of phosphoric acid, sulfuric acid and/or haloalkanoic acids into 1-methyl-3-phenylindans. The reaction is carried out at temperatures above 150° C. or mixtures of styrene and the indan to be prepared are used instead of the starting material styrene at temperatures below 150° C. In the latter case the concentration of end product in the starting mixture is higher than the concentration of styrene. The two methods can only be carried out continuously.

It is an object of this invention to provide a new process for preparing 1-methyl-3-phenylindans in a simpler and more economical manner and at the same time in better yields and space-time yields and in good purity.

U.S. Pat. 3,723,555 (Ser. No. 149,779) discloses a process for the production of 1-methyl-3-phenylindans of the general formula (I):

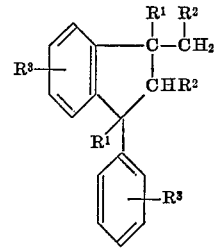

(I)

in which $R^1$, $R^2$ and $R^3$ are identical or different and each is alkyl or hydrogen, and $R^3$ may also be halogen, by dimerizing styrenes in the presence of a catalyst, wherein the reaction is carried out with a styrene of the general formula (II):

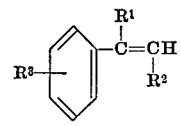

(II)

in which $R^1$, $R^2$ and $R^3$ have the meanings given above in the presence of a polymerization inhibitor.

We have now found that the process of the said U.S. patent may be modified by using a surfactant instead of the polymerization inhibitor or in addition to the polymerization inhibitor.

The reaction may be represented as follows when styrene is used:

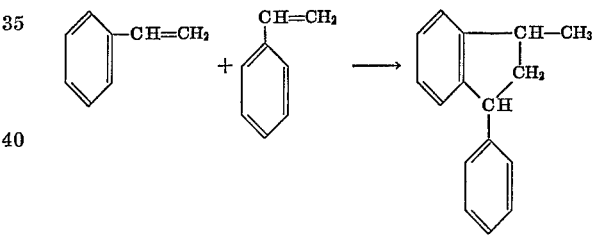

As compared with the prior art methods the process of this invention provides 1-methyl-3-phenylindans in better yields, better space-time yields and good purity and is easier to carry out and more economical. Yields of end product of from 65 to 80% of theory can be achieved at goodtime yields. Having regard to the prior art these advantageous results are surprising and are achieved continuously at temperatures below 150° C. and without mixing end product with the starting styrene. Unlike the method of the Belgian patents the process may be carried out batchwise; this is of economic significance for processing small portions or residual portions of starting material.

Preferred starting materials of the general formula (II) and accordingly preferred end products (I) are those in whose formulae $R^1$, $R^2$ and $R^3$ are identical or different and each is alkyl of one to four carbon atoms or hydrogen, and $R^3$ may also be chlorine or bromine. For example the following are suitable as starting materials: styrene, o - chlorostyrene, p - bromostyrene, p - methyl-styrene, α-methylstyrene, β-propylstyrene, α,β-dimethylstyrene, and α-isobutylstyrene. The starting materials may be used in gaseous or liquid phase.

Any catalyst suitable for the polymerization of styrene may be used, for example acids and/or silicic acid compounds. Phosphoric, sulfuric and/or haloalkanoic acids are used as a rule. In the case of gaseous starting materials (II) the acids are advantageously used in a ratio of from 50 to 1000, particularly from 100 to 500, moles calculated as 100%) per mole of starting material (II). In the case of liquid starting materials (II) from 4 to 0.25, particularly from 2 to 0.5, parts by volume of acid (calculated as 100%) per volume of starting material (II) is suitable. The acids may be used in concentrated form or mixed with water. The following are suitable for example: metaphosphoric acid, pyrophosphoric acid and particularly orthophosphoric acid, conveniently in the form of an aqueous solution, with from 50 to 90% preferably 60 to 80%, by weight of phosphorus pentoxide; aqueous 50 to 80% by weight sulfuric acid; monochloroacetic acid, dichloroacetic acid, trichloroacetic acid and chloropropionic acid. Appropriate mixtures, advantageously of phosphoric acid and sulfuric acid, with or without water, preferably in a ratio by weight of from 70 to 95% by weight of phosphoric acid (calculated as 100%), from 0 to 20% by weight of sulfuric acid (calculated as 100%) and from 0 to 20% by weight of water, are also suitable.

Silicates, for example sodium aluminum silicate, calcium aluminum silicate, bleaching clays, fuller's earth, clays, kaolin, allophanes, zeolites, montmorillonite, pumice, Florida earth, asbestos, mullite, bentonite; silicic acid, silica gel or infusorial earth may conveniently be used as silicic acid compounds. The silicic acid compounds may contain metal oxides, for example oxides of aluminum, zirconium or magnesum.

The solid phosphoric acid catalysts may be metaphosphoric, pyrophosphoric and/or preferably orthophosphoric acid which are conveniently applied as such or in the form of an aqueous solution to a carrier material. The phosphoric acid may also be in the form of a polyphosphoric acid, for example with from 72 to 88% by weight of $P_2O_5$. It is advantageous to use as the carrier a silicic acid compound, preferably precipitated silicic acid, silica gel or infusorial earth, but bauxite, magnesite, aluminum oxide, activated carbon and quartz are also suitable as carrier materials. The phosphoric acid catalysts contain the phosphoric acid (irrespective of the actual constitution calculated as orthophosphoric acid) generally in an amount of from 10 to 80%, preferably from 30 to 80%, by weight of acid based on the carrier material. These catalysts are prepared by conventional methods, for example by application of the acid to the carrier and drying and calcining it, for example at from 200° to 900° C. in a reducing, oxidizing or inert atmosphere.

The particle size of solid catalysts is preferably from 1 to 10 mm. They may have any shape, for example spherical or granular. The solid catalyst is generally used in an amount of from 10 to 1000%, preferably from 80 to 200%, by weight based on the amount of starting material (II) fed to the reaction per hour. Houben-Weyl, "Methoden der organischen Chemie," volume 4/2, pages 142 et seq. and Ullmanns Encyklopädie der technischen Chemie, volume 9, pages 271 et seq. are referred to for details of the production of the catalysts.

Any substance which prevents or markedly retards the polymerization of monomers and thus acts as a stabilizer in relation to the monomers may be used as polymerization inhibitor. The substance may be gaseous, solid or liquid. Those which inhibit the polymerization of vinyl compounds are preferred. It is advantageous to use the following substances as inhibitors: thioureas, for example thiourea, methylthiourea, phenylthiourea, N,N-diphenylthiourea, N,N'-diphenylthiourea, N-methyl-N-(p-toluyl)-thiourea, S-benzyl-N-phenylisothiouronium picrate, S-methyldithiobiuret hydrochloride, phenylmethylthiourea, 2,4-dimethoxyphenylthiourea, 4 - methoxyphenylthiourea, di-n-butylthiourea, 1-benzoylthiosemicarbazide, dithiobiuret; phenols, thiophenols and their ethers, for example hydroquinone monomethyl ether, 4-tert-butylpyrocatechol, N-benzyl-p-aminophenol, o-aminophenol; sulfur-containing heterocyclic compounds having sulfur as a substituent or in a side chain of the heterocyclic ring, for example 2-mercaptobenzimidazole, 2-mercapto-4-anilinoquinazoline, 2-thiocyanomethylbenzimidazole, or with a sulfur atom in the heterocyclic ring, for example phenothiazine, thionaphthene, 2-mercaptobenzothiazole, 2-aminobenzothiazole, 3-aminobenzoisothiazole, 2-methylbenzothiazole, diphenylene sulfide, 2,5-dimercapto-1,3,4-thiadiazole, and tetramethylenetrithione; substituted aromatic amines, for example N-phenyl-α-naphthylamine, N-phenyl-β-naphthylamine; nitroso compounds, for example o-nitrosophenol, p-nitrosophenol, m-nitrosophenol, N-nitrosophenyl hydroxylammonium salt (cupferron), nitrogen monoxide, and dinitrogen tetroxide; organic phosphorus compounds, for example triphenylphosphine and triphenyl phosphite; thiocarboxamides, for example thioacetamide, anthranilothiamide, 2-amino-5-nitrothiobenzamide, 2-amino-3-bromo-5-nitrothiobenzamide, 2 - amino-3,5-dibromothiobenzamide, thiobenzamide, and appropriate mixtures. Generally from $10^{-5}$ to $10^{-2}$, preferably from $10^{-4}$ to $10^{-3}$ mole of polymerization inhibitor is used per mole of starting material (II).

The reaction is carried out in the presence or absence of polymerization inhibitors and in the presence of a surfactant, preferably in an amount of from $10^{-5}$ to $10^{-1}$, particularly from $10^{-4}$ to $10^{-2}$, mole of surfactant per mole of starting material (II). When mixtures of surfactants or mixtures of one surfactant and other additives are used it is advantageous in many cases to use from 0.05 to 10%, preferably from 0.08 to 1.5%, by weight of the mixture based on the weight of the starting material (II). As regards the classification, properties and the individual groups of surfactants, reference is made to Ullmanns Encyklopädie der technischen Chemie, volume 16, pages 724 et seq. (under "Tenside"). Surfactants have the ability to accumulate at interfaces and to modify their physical properties, particularly the interfacial tension. Anionic, cationic, amphoteric and nonionic surfactants are suitable for the process of this invention. One surfactant or appropriate mixtures or commercially available formulations and products containing such surfactants, for example emulsifiers, detergents, wetting agents or wetting detergents, dyeing auxiliaries or raw materials for detergents may be used.

Examples of suitable anionic surfactants are salts of carboxylic acids, for example soaps and salts of abietic acid; sulfuric acid esters, for example sulfated oils and fatty acids such as the salts of sulfated beef tallow or castor oil, turkey red oil, sulfated esters or amides such as salts of the sulfated dibutylamide of oleic acid; alkyl sulfates such as the monoethanolamine salt of 2-ethylhexanol sulfate, $C_8$ to $C_{18}$ fatty alcohol sulfate, tallow fatty alcohol sulfate, isooctylphenol sulfate and its reaction products with ethylene oxide; sulfated fatty acid monoglycerides or fatty acid alkylolamides, sulfated ethers, salts of lignin sulfonic acid; alkyl sulfonates, for example the salts of paraffin monosulfonic and disulfonic acids, also in the form of sulfosuccinic esters such as the sodium salt of sulfosuccinic dinonyl ester; alkylaryl sulfonates, for example appropriate naphthalene or benzene sulfonates such as sodium dodecylbenzenesulfonate, dibutylnaphthalenesulfonate, dipropylnaphthalenesulfonate or benzylnaphthalenesulfonate, condensation products of β-naphthalenesulfonic acid with formaldehyde; alkyl phosphates, and salts of alkylbenzene phosphonic acids.

Examples of cationic surfactants are primary, secondary and tertiary amine salts; quaternary ammonium salts, for example reaction products of ethylene oxide and oleylamine which have been quaternized with dimethyl sulfate, the reaction product of 1 mole of stearic acid, 1 mole of triethanolamine and 1 mole of dimethyl sulfate, condensation products of 1 mole of palm kernel fat, 1 mole of benzylamine and 1 mole of dimethyl sulfate, dimethylbenzylphenylammonium chloride, laurylpyridinium chloride, and lauryltrimethylammonium chloride; phosphonium salts and sulfonium salts are also suitable.

Examples of amphoteric surfactants are betaines, sulfobetaines and sulfatobetaines.

Examples of nonionic surfactants are ethylene oxide adducts, for example alkylpolyethylene glycols such as octadecylpolyethylene glycols, isononylpolyethylene glycols-alkylphenhpolyethylene glycols, for example isooctylphenylpolyethylene glycol, nonylphenypolyethylene glycol, phenylethyl-$\beta$-naphthylpolyethylene glycol, acylpolyethylene glycols, for example those of stearic acid, oleic acid, and lauric acid, reaction products of rosin or castor oil and ethylene oxide or oxyethylated polypropylene glycols; fatty acid monoglycerides; anhydrosorbitol monofatty acid esters; fatty acid alkylolamides such as triethanolamine oleic acid esters, triethanolamine stearic acid esters or diethanolamine stearic acid esters; saccharose monofatty acid esters; and reaction products of ethlyene oxide and amines or amides such as oleylamine or ethanolamides of stearic acid and oleic acid.

The reaction is carried out as a rule at a temperature of from 30° to 200° C. at subatmospheric or superatmospheric pressure, for example at from 0.3 to 30, particularly from 0.5 to 1.5, atmospheres, or preferably at atmospheric pressure, continuously or batchwise. In the case of liquid catalysts the preferred temperatures are from 40° to 80° C. and in the case of solid catalysts the preferred temperatures are from 100° to 150° C. Organic solvents which are inert under the reaction conditions may be used in the reaction if desired. Examples are aliphatic hydrocarbons such as n-pentane, n-heptane, cycloaliphatic hydrocarbons such as cyclohexane, or mixtures of the same.

The reaction may be carried out as follows: any apparatus in which styrene can be brought into intimate contact with the catalyst may be used as the reactor. In the case of liquid catalysts such as the said acids, for example a bubble column, a cascade reactor, glass tray column, packed column, sieve-plate column, bubble tray column, valve tray column or Oldershaw column may be used. The gaseous or liquid styrene is dimerized in the reactor at the reaction temperature cocurrent or countercurrent to the acid. In a suitable type of reactor the acid may be charged first and the styrene passed through the same with good mixing. When using a column the acid is conveniently passed through continuously, the throughput of liquid conveniently being from 10 to 100 m.$^3$ per m.$^2$ of column cross-sectional area per hour. After it has left the reactor the acid may be separated from the organic reaction product and returned to the reactor. The velocity of the gaseous styrene is advantageously from 0.1 to 2.0 meters per second based on the cross-section of the column. The residence time in the reactor is as a rule from 0.1 to 5 minutes. The reaction mixture is separated from the acid in a downstream separator and the end product is isolated by a conventional method, for example by fractional distillation. Unreacted starting material and the acid are returned to the reaction. The starting material is generally supplied to the reactor in gaseous or liquid form. If desired it may be supplied in liquid form, vaporized in the reactor and only then contacted with the acid so that the reaction begins.

A mixture of starting material (II) and acid may also be reacted at the reaction temperature in a stirred vessel or a cascade of stirred vessels continuously or batchwise for from 0.5 to 2 hours. In such cases the range of the reaction temperature is conveniently chosen at from 30° C. to the boiling point of the styrene in question at the reaction pressure, for example from 0.3 to 3.0 atmospheres.

An advantageous modification of the reaction is as follows: styrene (II) is dimerized at the reaction temperature in a stirred apparatus or stirred vessel cascade with intense mixing, conveniently with a stirring output of from 5 to 10 kilowatts per m.$^3$ in the presence of acid and the appropriate indan (I) in the concentrations specified above. Such an amount of starting material is continuously supplied and such an amount of reaction mixture continuously withdrawn that the above-mentioned concentrations of starting material and end product are maintained throughout the entire reaction period in the organic phase of the mixture. The residence time of the reaction mixture in the reaction chamber is generally from ten to thirty minutes. The mixture of the reaction components can be prepared at the reaction temperature or at a lower temperature at the beginning and then brought to the reaction temperature. In a stirred vessel cascade the individual stirred vessels may be kept at different temperatures.

That portion of the reaction mixture which has been withdrawn passes to phase separation. The separated aqueous phase which contains the acid can be returned immediately to the reaction. The acid may however be isolated by a conventional method, for example by filtration, centrifuging, distillation or extraction. Each vessel in the cascade may have its own acid loop or all the vessels may have a common loop. In the former case the acid concentration may vary from vessel to vessel. The end product is separated from the organic phase by a conventional method, for example by distillation.

In the case of a solid catalyst the starting material (II) may be passed continuously at the reaction temperature in the liquid or gaseous phase over a bed of catalyst in a tubular reactor. In the batch method a mixture of starting material (II) and solid catalyst may be reacted in a manner similar to that used in the case of liquid acid catalysts. The catalyst may be suspended in the liquid starting material (II) or fluidized in a fluidized bed.

The polymerization inhibitor may be supplied to the reaction in any suitable way, for example mixed with the starting material (II) or the solid catalyst, in solution or suspension in the liquid catalyst, or separately. In the separation of the end product it may be separated depending on its constitution from the organic phase and used again, or in the case of acid-soluble inhibitors may be returned to the reaction with the acid.

The compounds which can be prepared by the process of the invention are valuable starting materials for the production of dyes and pesticides. The above-mentioned publications and German Patents . . . . . . . (patent application P 19 34 086.4); . . . . . . . (patent application P 19 34 055.07) and . . . . . . . (patent application P 19 15 385.6) may be referred to for details of use.

The following Examples illustrate the invention. The parts specified are parts by weight. Parts by weight bear the same relation to parts by volume as the kilogram to the liter.

EXAMPLES 1 TO 52

(Batchwise liquid-liquid dimerization)

Method: 100 parts by volume of phosphoric acid (98% by weight) is heated to 50° to 60° C. in a stirred vessel and at this temperature the parts of surfactant specified in the following Table and then 104 parts of styrene are added in portions over forty minutes. The end product (1 - methyl - 3 - phenylindan) is then separated by extraction of the reaction mixture with 100 parts of methylene chloride followed by fractional distillation of the extract. The composition of the distillate is determined by gas chromatography. The total yield of dimers (D), of linear styrene dimers (S) and the yield of end product (I) (EP(I)) are given in the following Table for various surfactants. The yield of (D) and EP(I) is in percent of theory based on starting material (II); the yields of (S) are given in percent by weight based on (D).

NOTE.—Ex=Example.

| | Parts | D | S | EP(I) |
|---|---|---|---|---|
| Comparison | | 60.0 | 10.0 | 60.0 |
| Ex surfactant: | | | | |
| (A) Anionic surfactants: | | | | |
| 1. Sodium paraffinsulfonate | 1.0 | 75.3 | 7.9 | 69.0 |
| 2. Sodium paraffindisulfonate | 1.0 | 74.0 | 8.5 | 67.7 |
| 3. Sodium dodecylbenzenesulfonate | 1.0 | 73.0 | 9.6 | 66.0 |
| 4. Sodium dibutylnaphthalene-α-sulfonate | 0.5 | 74.9 | 8.7 | 68.4 |
| 5. Sodium dipropylnaphthalene-α-sulfonate | 0.5 | 75.6 | 9.1 | 68.7 |
| 6. Sodium salt of condensation product of 1 mole of β-naphthalenesulfonic acid and 1 mole of formaldehyde | 1.0 | 74.6 | 8.2 | 68.5 |
| 7. Sodium benzylnaphthalene-α-sulfonate | 1.0 | 73.8 | 7.3 | 68.4 |
| 8. Sodium salt of sulfated beef tallow | 0.1 | 75.8 | 8.6 | 69.3 |
| 9. Ammonium salt of sulfated castor oil | 0.1 | 72.6 | 7.5 | 67.2 |
| 10. Sodium salt of sulfosuccinic dinonyl ester | 0.1 | 74.8 | 7.9 | 68.9 |
| 11. Sodium lignin sulfonate | 0.1 | 78.2 | 9.6 | 70.7 |
| 12. Condensation product of 34% by weight of cresol-formaldehyde resin (molar ratio of components 1:1) with 33% by weight of sodium 2-naphthol-6-sulfonate and 33% by weight of sodium sulfite and formaldehyde (molar ratio of the components 1:1:1.5) | 1.0 | 75.0 | 10.5 | 67.1 |
| 13. 2-ethylhexanolsulfate monoethanolamine salt | 0.1 | 76.2 | 8.7 | 69.6 |
| 14. Sodium salt of $C_8$ to $C_{18}$ fatty alcohol sulfate | 0.1 | 73.1 | 7.8 | 67.4 |
| 15. Sodium salt of sulfuric acid ester of tallow fatty alcohol | 0.1 | 72.9 | 7.5 | 67.4 |
| 16. Sodium salt of acid sulfuric acid ester of the reaction product of 80 moles of ethylene oxide and 1 mole of tallow fatty alcohol | 0.1 | 75.1 | 8.6 | 68.6 |
| 17. Sodium salt of acid sulfuric acid ester of the reaction product of 1 mole of isooctylphenol and 25 moles of ethylene oxide | 0.1 | 74.3 | 9.1 | 67.6 |
| 18. Sodium salt of sulfated oleic acid dibutylamide | 0.1 | 73.8 | 7.5 | 68.3 |
| 19. Resin soap (sodium abietate) | 0.1 | 73.6 | 8.1 | 67.6 |
| 20. Turkey red oil | 3.0 | 78.3 | 12.5 | 68.5 |
| (B) Nonionic surfactants: | | | | |
| 21. Reaction product of 1 mole of octadecyl alcohol and 32 moles of ethylene oxide | 0.1 | 75.2 | 8.6 | 68.7 |
| 22. Condensation product of 1 mole of tallow fatty alcohol and 8 moles of ethylene oxide | 0.1 | 73.6 | 7.9 | 67.8 |
| 23. Condensation product of 1 mole of isononanol and 5 moles of ethylene oxide | 0.1 | 72.5 | 8.1 | 66.2 |
| 24. Condensation product of 1 mole of isooctylphenol and 6 to 7 moles of ethylene oxide | 0.1 | 73.8 | 7.5 | 68.3 |
| 25. Condensation product of 1 mole of nonylphenol and 30 moles of ethylene oxide | 0.1 | 74.2 | 8.5 | 67. |
| 26. Condensation product of 1 mole of phenylethyl-β-naphthol and 18 moles of ethylene oxide | 0.1 | 75.1 | 7.6 | 69.4 |
| 27. Condensation product of 1 mole of stearic acid and 7 to 9 moles of ethylene oxide | 0.1 | 76.3 | 8.1 | 70.1 |
| 28. Condensation product of 1 mole of oleic acid and 5 to 6 moles of ethylene oxide | 0.5 | 76.4 | 7.9 | 70.4 |
| 29. Condensation product of 1 mole of lauric acid and 10 moles of ethylene oxide | 0.1 | 73.8 | 6.7 | 68.9 |
| 30. Condensation product of 1 mole of castor oil and 40 moles of ethylene oxide | 0.1 | 75.1 | 8.2 | 69.0 |
| 31. Condensation product of 1 mole of rosin and 23 moles of ethylene oxide | 0.1 | 76.0 | 7.9 | 70.0 |
| 32. Condensation product of 1 mole of oleylamine and 9 moles of ethylene oxide | 0.1 | 72.1 | 7.5 | 66.7 |
| 33. Condensation product of 1 mole of stearic monoethanolamide and 3 moles of ethylene oxide | 0.1 | 73.5 | 6.8 | 68.5 |
| 34. Condensation product of 1 mole of oleic monoethanolamide and 3 to 4 moles of ethylene oxide | 0.1 | 74.3 | 7.2 | 69.0 |
| 35. Condensation product of 1 mole of oleic diethanolamide and 8 to 10 moles of ethylene oxide | 0.1 | 75.1 | 7.1 | 69.8 |
| 36. Triethanolamine monooleate | 0.1 | 81.5 | 10.1 | 73.3 |
| 37. Triethanolamine monostearate | 0.1 | 80.1 | 9.8 | 72.2 |
| 38. Condensation product of 1 mole of stearic acid and 2 moles of diethanolamine | 0.1 | 75.2 | 7.4 | 69.6 |
| (C) Cationic surfactants: | | | | |
| 39. Reaction product of 1 mole of oleylamine and 6 to 7 moles of ethylene oxide followed by quaternization with dimethyl sulfate | 0.1 | 73.2 | 7.1 | 68.0 |
| 40. Reaction product of 1 mole of stearic acid and 1 mole of triethanolamine followed by quaternization with dimethyl sulfate | 0.1 | 72.1 | 6.4 | 67.5 |
| 41. Condensation product of 1 mole of palm kernel oil and 1 mole of benzylamine followed by quaternization with dimethyl sulfate | 0.5 | 81.6 | 11.2 | 72.5 |
| 42. Dimethylbenzylphenyl ammonium chloride | 0.1 | 75.6 | 7.8 | 69.7 |
| 43. Laurylpyridinium chloride | 0.1 | 76.1 | 7.1 | 70.7 |
| 44. Lauryltrimethylammonium chloride | 0.1 | 74.1 | 6.8 | 69.1 |
| (D) Mixtures of different emulsifiers: | | | | |
| 45. Turkey red oil and sodium salt of dibutylnaphthalene-α-sulfonic acid | 3.0 / 0.5 | 75.6 | 8.1 | 69.5 |
| 46. Turkey red oil condensation product of 1 mole of oleic acid and 5 to 6 moles of ethylene oxide | 3.0 / 1.0 | 78.1 | 8.5 | 71.5 |
| 47. Sodium lignin sulfonate sodium benzylnaphthalene-α-sulfonate | 1.0 / 0.1 | 76.3 | 9.1 | 69.4 |
| 48. Condensation product of 1 mole of oleic acid and 5 to 6 moles of ethylene oxide; surfactant of Example 41 | 1.0 / 0.5 | 79.1 | 8.1 | 72.7 |
| (E) Mixtures of polymerization inhibitors and emulsifiers: | | | | |
| 49. Turkey red oil phenothiazine | 3.0 / 0.1 | 81.6 | 8.4 | 74.7 |
| 50. Turkey red oil N-phenlthiourea | 3.0 / 0.1 | 79.8 | 7.5 | 73.8 |
| 51. Surfactant of Example 41 phenothiazine | 0.5 / 0.1 | 76.1 | 7.1 | 70.7 |
| 52. Condensation product of 1 mole of oleic acid and 5 to 6 moles of ethylene oxide thiourea | 0.1 / 0.1 | 76.7 | 8.5 | 70.3 |

EXAMPLE 53

(Continuous liquid-liquid dimerization)

80 parts per hour of styrene is passed into a continuously operated stirred apparatus containing 99.8 parts of phosphoric acid (99% by weight), 0.2 part of triethanolamine monooleate and 58 parts of 1-methyl-3-phenylindan. The reaction mixture is mixed well, the reaction temperature is from 70° to 75° C. 80 parts of reaction mixture is withdrawn per hour. That portion of the reaction mixture which has been withdrawn is supplied through a lateral outlet to a separating vessel which has been heated to 120° to 140° C. and the phosphoric acid separating as the heavier phase therein is returned to the reactor. The effluent organic phase is fractionally distilled. With reference to styrene the following are obtained per hour:

61.5 parts of 1 - methyl - 3 - phenylindan having a boiling point of 150° C. at 6.5 mm. (76.8% of theory) and
6.5 parts of 1,3 - diphenylbutene - 1 having a boiling point of 160° C. at 6.5 mm. (8.1% of theory).

Conversion of styrene is 99.4%.

We claim:

1. A process for the production of 1-methyl-3-phenyl-indans of the formula (I):

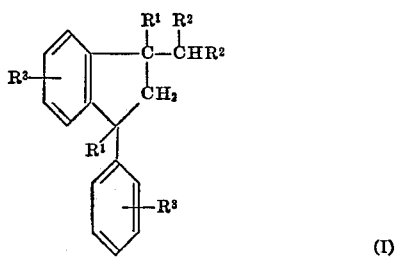

in which $R^1$, $R^2$ and $R^3$ are identical or different and each is alkyl or hydrogen, $R^3$ may also be halogen, by dimerizing styrenes in the presence of a catalyst, the reaction being carried out with a styrene of the formula (II):

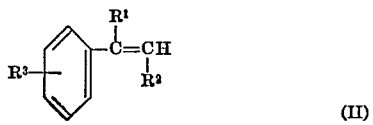

in which $R^1$, $R^2$ and $R^3$ have the meanings given above in the presence of a surfactant with or without a polymerization inhibitor.

2. A process as claimed in claim 1 carried out in the presence of phosphoric acid, sulfuric acid and/or a haloalkanoic acid or a silicic acid compound as a catalyst.

3. A process as claimed in claim 1 carried out in the presence of from $10^{-5}$ to $10^{-2}$ mole of polymerization inhibitor per mole of starting material (II).

4. A process as claimed in claim 1 carried out at a temperature of from 30° to 200° C.

5. A process as claimed in claim 1 carried out at a temperature of from 40° to 80° C.

6. A process as claimed in claim 1 carried out at a temperature of from 100° to 150° C.

7. A process as claimed in claim 1 carried out in the presence of an organic solvent which is inert under the reaction conditions.

8. A process as claimed in claim 1 carried out in the presence of a surfactant in an amount of from $10^{-5}$ to $10^{-1}$ mole of surfactant per mole of starting material (II).

9. A process as claimed in claim 1 carried out in the presence of a surfactant in an amount of from $10^{-4}$ to $10^{-2}$ mole of surfactant per mole of starting material (II).

10. A process as claimed in claim 1 wherein $R^1$, $R^2$ and $R^3$ are identical or different and each is alkyl of 1 to 4 carbon atoms or hydrogen, and $R^3$ may also be chlorine or bromine.

References Cited

UNITED STATES PATENTS

| | | | |
|---|---|---|---|
| 3,248,440 | 4/1966 | Albert | 260—666.5 |
| 3,426,063 | 2/1969 | Gros | 260—666.5 |
| 3,432,563 | 3/1969 | Metzler | 260—666.5 |
| 2,249,987 | 7/1941 | Stanley et al. | 260—668 F |
| 3,161,692 | 12/1964 | McLaughlin et al. | 260—669 P |
| 3,385,905 | 5/1968 | Smith et al. | 260—669 P |
| 3,723,555 | 3/1973 | Armbrust et al. | 260—669 P |

CURTIS R. DAVIS, Primary Examiner

U.S. Cl. X.R.

260—666.5, 669 P

UNITED STATES PATENT AND TRADEMARK OFFICE
CERTIFICATE OF CORRECTION

PATENT NO. : 3,830,863
DATED : August 20, 1974
INVENTOR(S) : Herbert Armbrust, G. Kilpper, H. Quadbeck-Seeger,
H. Sturm, W. Koehler, and H. Schecker It is certified that error appears in the above-identified patent and that said Letters Patent are hereby corrected as shown below:

In the heading, insert --Claims priority, Application German, December 6, 1971, P 21 60 378.1--;

Column 3, line 10, delete "calculated" and insert --(calculated--;

Column 8, under the heading EP(I), No. 25, delete "67." and insert --67.9--;

Column 9, line 12, delete "160°" and insert --164°--;

Column 9, the first formula in claim 1, delete "$CHR^2$" and insert --$CH^2$--;

Column 9, the first formula in claim 1, delete "$CH_2$" and insert --$CHR_2$--.

Signed and Sealed this seventh Day of October 1975

[SEAL]

Attest:

RUTH C. MASON
Attesting Officer

C. MARSHALL DANN
Commissioner of Patents and Trademarks